United States Patent [19]

Deller et al.

[11] Patent Number: 5,231,067
[45] Date of Patent: Jul. 27, 1993

[54] SHAPED ARTICLES BASED ON PYROGENICALLY PRODUCED TITANIUM DIOXIDE, METHOD OF THEIR PRODUCTION AND THEIR USE

[75] Inventors: Klaus Deller, Hainburg; Bertrand Despeyroux, Hanau; Helmfried Krause, Rodenbach, all of Fed. Rep. of Germany

[73] Assignee: Degussa AG, Fed. Rep. of Germany

[21] Appl. No.: 773,504

[22] Filed: Oct. 9, 1991

Related U.S. Application Data

[62] Division of Ser. No. 508,564, Apr. 13, 1990.

[51] Int. Cl.$^5$ .................. B01J 21/00; B01J 37/00
[52] U.S. Cl. ..................... 502/350; 502/509
[58] Field of Search ................ 502/350, 506, 509

[56] References Cited

U.S. PATENT DOCUMENTS

| | | | |
|---|---|---|---|
| 3,849,337 | 11/1974 | Manara et al. | 502/350 |
| 4,048,112 | 9/1977 | Matsushita et al. | 502/350 |
| 4,113,660 | 9/1978 | Abe et al. | 502/350 |
| 4,482,643 | 11/1984 | Harju et al. | 502/242 |
| 5,002,917 | 3/1991 | Deller et al. | 502/350 |

FOREIGN PATENT DOCUMENTS 3217751 11/1983 Fed. Rep. of Germany.

OTHER PUBLICATIONS

Article entitled "Effects of Thermal Pretreatment on Coarsening of Nominally Monodispersed Titania" in the publ. Communications of the American Ceramic Society Apr., 1988 pp. C-198-C-201.

*Primary Examiner*—Carl F. Dees
*Attorney, Agent, or Firm*—Cushman, Darby & Cushman

[57] ABSTRACT

Pressed parts based on pyrogenically produced titanium dioxide with the following physico-chemical characteristics:

| | |
|---|---|
| Outer diameter | 0.8–15 mm |
| BET surface according to DIN 66 131 | $<1$–20 m$^2$/g |
| Pore volume | 0.01–0.29 cm$^3$/g |
| Pore distribution | no pores $<10$ nm |
| | at least 90% of the pores in a range of 10–80 nm |
| Breaking strength | 30–500 N/pressed part |
| TiO$_2$ phase | rutile 100% |
| Composition | $>99.5\%$ TiO$_2$ |

They are produced by mixing pyrogenically produced titanium dioxide with urea, graphite and water, compacting the mixture, optionally drying the resulting mass at 80° C. to 120° C. comminuting, subsequently extruding or tabletting to produce pressed parts and tempering the pressed parts at a temperature of 710° C. to 1000° C. for a period of 0.5 to 6 hours.

The pressed parts can be used as catalyst or catalytic carrier.

4 Claims, No Drawings

005,231,067

SHAPED ARTICLES BASED ON PYROGENICALLY PRODUCED TITANIUM DIOXIDE, METHOD OF THEIR PRODUCTION AND THEIR USE

This is a division of application Ser. No. 07/508,564, filed Apr. 13, 1990.

The present invention relates to shaped articles based on pyrogenically produced titanium dioxide, a method for producing them from pyrogenically produced titanium dioxide and their use as catalytic carriers or catalysts.

BACKGROUND OF THE INVENTION

Pyrogenically produced titanium dioxide is produced by means of high-temperature hydrolysis of a volatile titanium compound, usually titanium tetrachloride, in an oxyhydrogen flame. This method is described in German Patent DE-PS 870,242 (1953). The resulting products primarily exhibit an anatase structure. They are hydrophilic, very pure and extremely fine. The primary particles (DIN 53 206) exhibit a spherical form and diameters of 10–100 nm in electronmicroscopical micrographs. A commercially available product exhibits an average primary particle size of 30 nm. Defined agglomerates (according to DIN 53 206) do not exist. The surface of the particles is smooth and free of pores. There is only an outer, readily accessible surface. The specific surface according to BET can be between 20 and 100 $m^2/g$, depending on production conditions. The afore-mentioned commercial product exhibits a specific surface of $50 \pm 15$ $m^2/g$.

Because of its high purity, high specific surface and the lack of pores, pyrogenically produced titanium dioxide is used as a titanium-dioxide component or as carrier material in catalytic systems (V. Rives-Arnau, G. Munuera, Appl. Surface Sci. 6 (1980) p. 122; N. K. Nag, T. Fransen, P. Mars, J. Cat. 68, p. 77 (1981); F. Solymosi, A. Erdöhelyi, M. Kocsis, J. Chem. Soc. Faraday Trans pp. 1, 77, 1003 (1981); D. G. Mustard, C. H. Bartholomew, J. Cat. 67, p. 186 (1981); M. A. Vannice, R. L. Garten, J. Cat. 63, p. 255 (1980), M. A. Vannice, R. L. Garten, J. Cat. 66, p. 242 (1980).

However, only powdery catalytic systems are discussed in the literature cited above. If pyrogenically produced titanium dioxide is to be used on an industrial scale in catalytic systems, it would be advantageous to convert the powdery product into shaped bodies.

Since pyrogenically produced titanium dioxide has an especially fine particle size, its formation into shaped catalytic carriers presents problems.

Published German Patent Application DE-OS 31 32 674 discloses a method for the production of pressed parts of pyrogenically produced titanium dioxide in which silica sol is used as binder. Ethylene glycol, glycerol, erytherites, pentitols or hexitols are used as auxiliary pressing agents. This method has the disadvantage that an undesired "covering" occurs in the pressed parts during large-scale production, that is, an outer layer separates from the pressed parts.

Moreover, when this method is used, the shaped bodies contain considerable amounts of $SiO_2$ in addition to $TiO_2$, which arises from the binding agent. This influences the effectiveness of the catalyst.

Published German Patent Application DE-OS 32 17 751 discloses the pressing of pyrogenically produce titanium dioxide in which organic acids or acidic-reacting salts are used as intermediate binding agents.

This method has the disadvantage that the nature of the surface of the pyrogenically produced titanium dioxide is changed by the treatment with organic acids or acidic-reacting salts.

Published German Patent Application P 38 03 894 also teaches titanium-dioxide pressed parts.

The known methods are disadvantageous because a binding agent must be used which remains in the pressed part. This leads to a change of the catalytic action of the very pure, pyrogenically produced titanium dioxide.

Methods using precipitated titanium dioxide have the disadvantage that impurities are introduced by the precipitation process which influence the catalytic action.

SUMMARY OF THE INVENTION

The object of the present invention is to provide pressed parts of pyrogenically produced titanium dioxide which retain the high purity of the starting material, that is, they do not contain residues of binding agents. Furthermore, the $TiO_2$ phase preferably should be in the rutile form.

The pressed parts based on pyrogenically produced titanium dioxide, according to the invention, have the following physico-chemical characteristics:

| | |
|---|---|
| Outer diameter | 0.8–15 mm |
| BET surface according to DIN 66 131 | <1–20 $m^2/g$ |
| Pore volume | 0.01–0.29 $cm^3/g$ |
| Pore distribution | no pores <10 nm |
| | at least 90% of the pores in a range of 10–80 nm |
| Breaking strength | 30–500 N/pressed part |
| $TiO_2$ phase | rutile 100% |
| Composition | >99.5% $TiO_2$ |

The outer diameter can preferably be 0.8 to 1.8 mm.

The length of the pressed parts can preferably be 1 to 15 mm.

The invention also provides a method for producing the pressed parts based on pyrogenically produced titanium dioxide with the following physico-chemical characteristics:

| | |
|---|---|
| Outer diameter | 0.8–15 mm |
| BET surface according to DIN 66 131 | <1–20 $m^2/g$ |
| Pore volume | 0.01–0.29 $cm^3/g$ |
| Pore distribution | no pores <10 nm |
| | at least 90% of the pores in a range of 10–80 nm |
| Breaking strength | 30–500 N/pressed part |
| $TiO_2$ phase | rutile 100% |
| Composition | >99.5% $TiO_2$ |

According to the method of the invention, pyrogenically produced titanium dioxide is mixed with urea, graphite and water, compacted, the mass obtained is optionally dried at 80° C. to 120° C. and comminuted, subsequently extruded or tabletted and the pressed parts obtained are tempered at a temperature of 710° C. to 1000° C. for a period of 0.5 to 6 hours.

In a preferred embodiment of the invention, the mixture can have the following composition before the pressing:

50-90% by weight titanium dioxide, preferably 65-85% by weight 5-50% by weight urea, preferably 15-30% by weight 0.1-8% by weight graphite, preferably 1-5% by weight.

In principle, all mixers or mills are suitable for carrying out the method of the invention, if they make it possible to achieve good homogenization, such as e.g. blade, fluid-bed, gyratory or air-swept mixers. Mixers with which an additional compression of the mixing material is possible are especially suitable, e.g. plowshare mixers, mulling machines, ball mills and extruders. After the homogenization, the mass can be directly extruded or it can be dried first, at 80°-120° C. The dry mass can be ground to a flowable powder. The drying and grinding of the voluminous and fine, pyrogenically produced titanium-dioxide powder, which are preferred measures, together with the auxiliary tabletting means and pore formers, result in a homogeneous, flowable powder which leads to shaped bodies with improved physical properties in terms of breaking strength and wear. The pressed parts can be produced in extruders, hand presses, eccentric presses or concentric-running presses as well as on compactors.

The breaking strength, specific total surface and the pore volume can be varied to some extent by varying the amounts of additives, the compression force and the tempering conditions.

The pressed parts of the invention can be produced in a variety of shapes such as, e.g., cylindrical, spherical, annular with an outer diameter of 0.8-15 mm.

The pressed parts of the invention can be used either directly as catalysts or as catalytic carriers after the shaped bodies have been impregnated, during or after their formation, with a solution of a catalytically active substance and optionally activated by means of a suitable posttreatment.

In particular, pressed parts of pyrogenically produced titanium dioxide can be used with especially good advantage as carriers or a catalysts in the Fischer-Tropsch synthesis and in the preparation of formaldehyde (dehydrogenation of methanol).

The pressed parts of the invention have the following advantages:

They have the same chemical composition as the starting material (pyrogenically produced titanium dioxide).

They do not contain any additives, such as binding agents, urea or graphite.

Great strength.

The titanium dioxide is present in the rutile form.

The predominant number of pores is in the mesopore range.

No pores > 10 nm.

The pressed parts of the invention contain no additional substances because only urea and graphite are used during the production method as pore former and lubricant. However, both substances are removed after the deforming process during the tempering.

DETAILED DESCRIPTION OF PREFERRED EMBODIMENTS

In the following examples:

The BET surface is determined according to DIN 66 131 with nitrogen.

The pore volume is calculated from the sum of the micro, meso and macropores.

The breaking strength is determined by means of the breaking-strength tester of the firm Erweka, type TBH 28. The pressing power is adjusted upward in a continuous manner via the tension of the motor until the shaped body (tablet, extrudate, sphere, etc.) breaks. The exerted force is indicated digitally at the moment of the break.

The determination of the micro and mesopores is made by recording an $N_2$ isotherm and evaluating it according to BET, de Boer and Barret, Joyner, Halenda. The determination of the macropores is made by the Hg injection method.

The titanium dioxide phase determination takes place by means of radiographs in a diffractometer.

Pyrogenically produced titanium dioxide P25 is used as titanium dioxide in the examples, which is characterized by the following physico-chemical characteristic data:

|  |  | $TiO_2$ P 25 |
|---|---|---|
| Surface according to BET | $m^2/g$ | 50 ± 15 |
| Average size of the primary particles | nm | 30 |
| Stamping density[1] normal item | g/l | approx. 150 |
| Drying loss[2] (2 hrs. at 105° C.) | % | <1.5 |
| Annealing loss[2)5] (2 hrs. at 1000° C.) | % | <2 |
| pH[3] (in 4% aqueous dispersion) |  | 3-4 |
| $SiO_2$[6] | % | <0.2 |
| $Al_2O_3$[6] | % | <0.3 |
| $Fe_2O_3$[6] | % | <0.01 |
| $TiO_2$[6] | % | <99.5 |
| HCl[6)8] | % | <0.3 |

[1] according to DIN 53 194
[2] according to DIN 55 921
[3] according to DIN 53 200
[5] relative to the substance dried 2 hours at 105° C.
[6] relative to the substance annealed 2 hours at 100° C.
[8] HCl content is a component of the annealing loss

EXAMPLE 1

70% titanium dioxide P 25
25% urea
5% graphite are compacted with the addition of water, dried at 100° C. for 24 hours and comminuted to a flowable powder.

The pressed pars are formed in an extruder.

The raw, extruded pressed parts are tempered at 720° C. for 6 hrs. The pressed parts obtained exhibit the following physico-chemical characteristics:

| Outer diameter | 1.2 mm |
|---|---|
| BET surface according to DIN 66 131 | 12 $m^2/g$ |
| Pore volume | 0.23 ml/g |
| Pore distribution | no pores < 10 $\phi$ 95% of the pores in a range of 10-80 nm $\phi$ |
| Breaking strength | 32 N/extruded pressed part |
| Bulk weight | 880 g/l |
| Composition | >99.5% $TiO_2$ |
| $TiO_2$ phase | rutile 100% |

EXAMPLE 2

Mixing and production of the raw, extruded pressed parts according to Example 1

The raw, extruded pressed parts produced in Example 1 are tempered at 800° C. for 4 hrs. The pressed parts obtained exhibit the following physico-chemical characteristics:

| | |
|---|---|
| Outer diameter | 1 mm |
| BET surface according to DIN 66 131 | 5 m²/g |
| Pore volume | 0.09 ml/g |
| Pore distribution | no pores < 10 ϕ |
| | 96% of the pores in a range of 10–80 nm ϕ |
| Breaking strength | 46 N/pressed part |
| Bulk weight | 1,250 g/l |
| Composition | >99.5% TiO₂ |
| TiO₂ phase | rutile 100% |

EXAMPLE 3

Mixing and production of the raw, extruded pressed parts are according to Example 1.

The raw, extruded pressed parts of Example 1 are tempered at 900° C. for 2 hrs. The pressed parts obtained exhibit the following physico-chemical characteristics:

| | |
|---|---|
| Outer diameter | 1 mm |
| BET surface according to DIN 66 131 | 1 m²/g |
| Pore volume | 0.04 ml/g |
| Pore distribution | no pores < 10 NM ϕ |
| | 97% of the pores in a range of 10–80 nm ϕ |
| Breaking strength | 65 N/pressed part |
| Bulk weight | 1,450 g/l |
| Composition | >99.5% TiO₂ |
| TiO₂ phase | rutile 100% |

EXAMPLE 4

70% titanium dioxide P 25
25% urea
5% graphite are homogenized in an asymmetric moving mixer.

The extruded pressed parts were produced on an extruder.

The raw, extruded pressed parts are tempered at 720° C. for four hours. The pressed parts obtained have the following physico-chemical characteristics:

| | |
|---|---|
| Outer diameter | 1.3 mm |
| BET surface according to DIN 66 131 | 13 m²/g |
| Pore volume | 0.27 ml/g |
| Pore distribution | no pores < 10 NM ϕ |
| | 94% of the pores in a range of 10–80 nm ϕ |
| Breaking strength | 31 N/pressed part |
| Bulk weight | 780 g/l |
| Composition | >99.5% TiO₂ |
| TiO₂ phase | rutile 100% |

EXAMPLE 5

72% titanium dioxide
25% urea
3% graphite are compacted with the addition of water, dried at 100° C. for 24 hrs. and comminuted to a flowable powder.

The tabletting takes place by means of an eccentric press.

The raw tablets are tempered at 900° C. for 4 hours. The pressed parts obtained have the following physico-chemical characteristics:

| | |
|---|---|
| Outer diameter | 5 mm |
| BET surface according to DIN 66 131 | 6 m²/g |
| Pore volume | 0.12 ml/g |
| Pore distribution | no pores < 10 NM ϕ |
| | 95% of the pores in a range of 10–80 nm ϕ |
| Breaking strength | 470 N/pressed part |
| Bulk weight | 1,700 g/l |
| Composition | >99.5% TiO₂ |
| TiO₂ phase | rutile 100% |

We claim:

1. A method of producing pressed parts on based on pyrogenically produced titanium dioxide which have the following physico-chemical characteristics:

| | |
|---|---|
| Outer diameter | 0.8–15 mm |
| BET surface according to DIN 66 131 | <20 m²/g |
| Pore volume | 0.01–0.29 cm³/g |
| Pore distribution | no pores <10 nm, |
| | at least 90% of the pores in a range of 10–80 nm |
| Breaking Strength | 30–500 N/pressed part |
| TiO₂ phase | rutile 100% |
| Composition | >99.5% TiO₂ | said method comprising forming a mixture consisting essentially of pyrogenically produced titanium dioxide, urea, graphite and water, compacting the mixture, optionally drying the compacted mixture at 80° C. to 120° C. and comminuting the mixture, forming the mixture into shaped articles, and tempering the pressed parts at a temperature of 710° C. to 1000° C. for a period of 0.5 to 6 hours.

2. A method as set forth in claim 1 in which the mixture which is compacted consists essentially of 50–90% by weight titanium dioxide, 5–50% by weight urea and 0.1–8% by weight graphite.

3. A method as set forth in claim 2 in which the mixture which is compacted consists essentially of 65–85% by weight titanium dioxide, 15–30% by weight urea and 1–5% by weight graphite.

4. A catalyst comprising pressed parts based on pyrogenically produced titanium dioxide which have the following physico-chemical characteristics:

| | |
|---|---|
| Outer diameter | 0.8–15 mm |
| BET surface according to DIN 66 131 | <20 m²/g |
| Pore volume | 0.01–0.29 cm³/g |
| Pore distribution | no pores <10 nm, |
| | at least 90% of the pores in a range of 10–80 nm |
| Breaking Strength | 30–500 N/pressed part |
| TiO₂ phase | rutile 100% |
| Composition | >99.5% TiO₂ | together with a catalytically active substance.

* * * * *